(12) United States Patent  (10) Patent No.: US 7,426,092 B2
Fukui et al.  (45) Date of Patent: Sep. 16, 2008

(54) MAGNETIC HEAD AND MAGNETIC DISK STORAGE APPARATUS MOUNTING THE HEAD

(75) Inventors: Hiroshi Fukui, Ibaraki (JP); Masafumi Mochizuki, Tokyo (JP); Kaori Suzuki, Tokyo (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 354 days.

(21) Appl. No.: 11/173,730

(22) Filed: Jun. 30, 2005

(65) Prior Publication Data

US 2006/0002018 A1    Jan. 5, 2006

(30) Foreign Application Priority Data

Jul. 1, 2004    (JP) .............................. 2004-195991

(51) Int. Cl.
*G11B 5/127* (2006.01)
(52) U.S. Cl. ............................................... 360/125.06
(58) Field of Classification Search ................ 360/125, 360/125.01, 125.02, 125.03, 125.04, 125.07, 360/125.06, 126, 234.7, 317, 319, 324.11
See application file for complete search history.

(56) References Cited

U.S. PATENT DOCUMENTS

| 5,822,153 | A  | * | 10/1998 | Lairson et al. | ............ | 360/234.7 |
| 6,185,077 | B1 | * | 2/2001  | Tong et al.    | ............. | 360/324.11 |
| 6,842,313 | B1 | * | 1/2005  | Mallary        | ...................... | 360/319 |
| 2003/0026039 | A1 | * | 2/2003 | Okada et al.  | ................. | 360/125 |
| 2003/0043513 | A1 | * | 3/2003 | Lin            | ............................ | 360/317 |
| 2005/0135007 | A1 | * | 6/2005 | Nishikawa et al. | .......... | 360/126 |

FOREIGN PATENT DOCUMENTS

JP    2003-045008 A    2/2003

* cited by examiner

*Primary Examiner*—Allen T Cao
(74) *Attorney, Agent, or Firm*—Townsend and Townsend and Crew LLP; Rambod Nader

(57) ABSTRACT

Embodiments of the invention provide a magnetic head which prevents data on a recording medium from being erased even when a stray field is applied. In one embodiment, an auxiliary pole is sandwiched between a stray-field shield composed of a magnetic layer recessed from the air bearing surface and a main pole. The stray-field shield may be formed on the leading side of the auxiliary pole. A face of the stray-field shield on a medium side may be recessed from an air-bearing-surface of the magnetic head.

27 Claims, 11 Drawing Sheets ( Prior Art )

Fig. 9
(a)
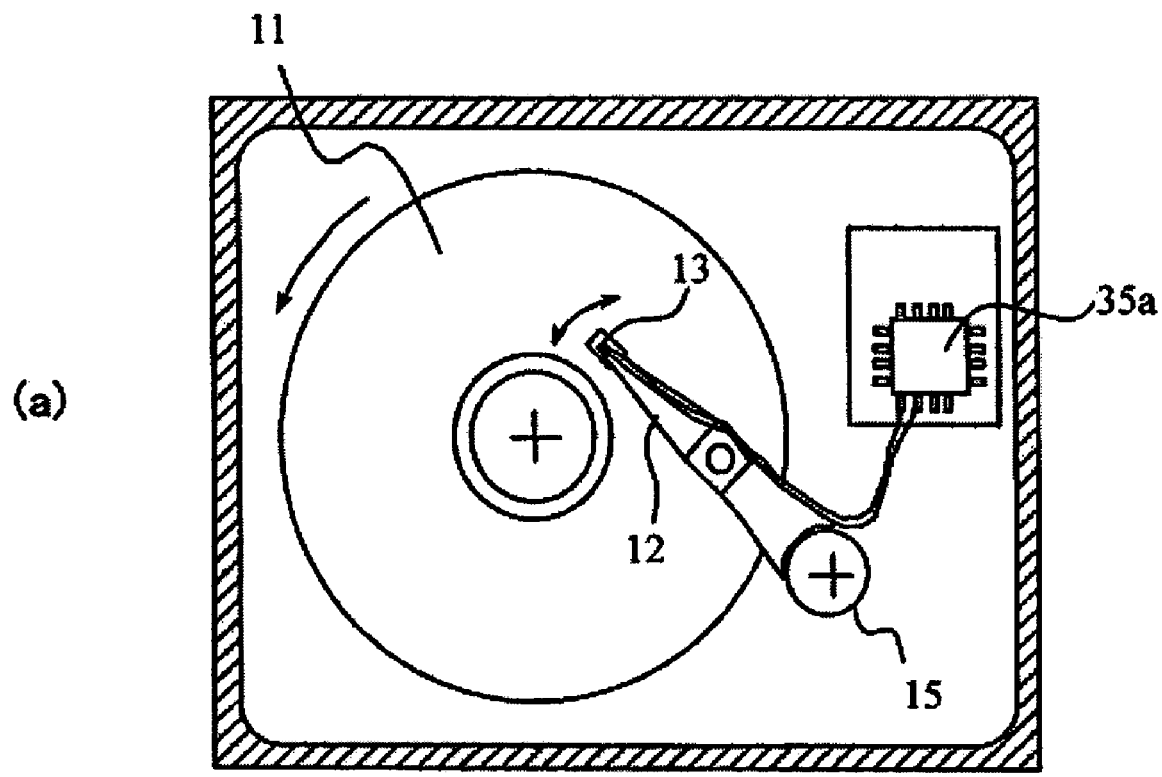
(b)
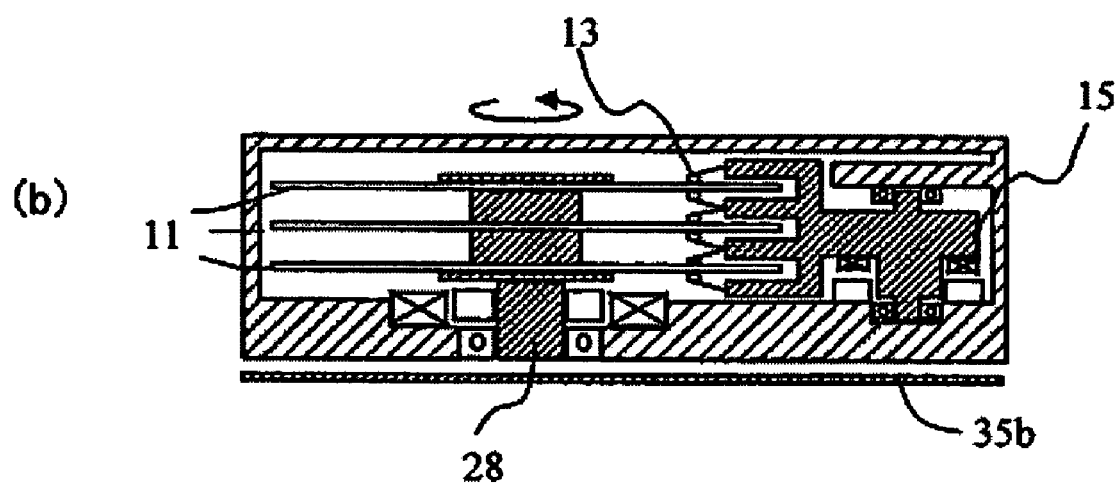

MAGNETIC HEAD AND MAGNETIC DISK STORAGE APPARATUS MOUNTING THE HEAD

CROSS-REFERENCES TO RELATED APPLICATIONS

This application claims priority from Japanese Patent Application No. JP2004-195991, filed Jul. 1, 2004, the entire disclosure of which is incorporated hereinby reference.

BACKGROUND OF THE INVENTION

The present invention relates to a perpendicular recording magnetic head and a magnetic disk storage apparatus mounting the perpendicular recording magnetic head.

A magnetic disk storage apparatus comprises a magnetic recording medium and a magnetic head to read and write data on the magnetic recording medium with the magnetic head. To expand the recording capacity per unit area of the magnetic recording medium, the areal recording density must be increased. However, in the current longitudinal recording system, when the bit length to be recorded becomes small, the surface recording density cannot be increased due to thermal fluctuations in the magnetization of the medium. As a solution to this problem, there is a perpendicular recording system for recording a magnetization signal in a direction perpendicular to the medium.

The perpendicular recording system is divided into two types: one using a double-layer perpendicular medium comprising a soft under layer as a recording medium and the other using a single-layer perpendicular medium having no soft under layer. When the double-layer perpendicular medium is used as a recording medium, recording is carried out with a so-called "single pole head" having a main pole and an auxiliary pole. In this case, a large magnetic field can be applied to the medium. The shape of the air bearing surface of the main pole is desirably trapezoid with a narrow width on the leading side in consideration of a case where the head has a skew angle. FIG. 5 shows the structure of a magnetic head having a single pole head of the prior art. As shown in FIG. 5, the magnetic head of the prior art comprises a lower shield 8, read element 7, upper shield 9, auxiliary pole 3, thin film coils 2 and main pole 1 from the traveling direction (leading side) of the head in the mentioned order. The lower shield 8, read element 7 and upper shield 9 constitute a read head 24 and the auxiliary pole 3, thin film coils 2 and main pole 1 constitute a write head (single pole head) 25. The recording medium has a soft under layer 20 under a magnetic recording layer 19. JP-A No. 45008/2003 (Patent Document 1) discloses a single pole head having a stray-field shield recessed from the medium opposed surface on the main pole through a gap film.

BRIEF SUMMARY OF THE INVENTION

The present invention relates to a perpendicular recording system comprising a perpendicular recording head having a main pole and an auxiliary pole and a double-layer perpendicular recording medium having an under layer. Since the magnetic head shown in FIG. 5 has the auxiliary pole and the thin-film coils between the read element and the main pole, the separation between the write head and the read head becomes large and the format efficiency deteriorates. Therefore, as shown in FIG. 6, a structure in which the auxiliary pole 3 is disposed on the trailing side of the main pole 1 is to be adopted. The separation between the write head and the read head can be made small by this structure.

The field gradients of the head field in the head traveling direction which determines the transition of the recording bit are an important factor for achieving a high recording density, together with the strength of a write head field. To achieve a higher recording density in the future, the field gradients must be further increased. To improve the field gradients, a magnetic layer 32 is arranged on the trailing side of the main pole 1. In the case of this structure, to form a closed magnetic circuit, the auxiliary pole 3 is desirably arranged on the trailing side of the main pole 1 as shown in FIG. 6.

In this perpendicular recording system having the soft under layer, there occurs a phenomenon that data recorded on the medium is erased by the influence of a stray field. The present invention is aimed to solve this erasure problem of the recorded data when a stray field is applied in parallel to the surface of the medium. FIG. 7 shows the structure of the head and the erasure positions of the recorded data on the disk when 50 Oe of a stray field is applied to a hard disk drive (HDD). The stray field is applied in parallel to the disk. The erasure positions of the recorded data are about 30 μm away from each other and correspond to the widths of the auxiliary pole and the read shield (upper shield, lower shield) used in this experiment. FIG. 8 shows a magnetic field around the magnetic recording layer opposed to the auxiliary pole when a stray field is applied in parallel to the surface of the medium, calculated by 3-D magnetic field computation. It is seen that the magnetic field becomes large at the edge of the auxiliary pole.

It is considered from the above that data erasure occurs at the edge of the auxiliary pole and at the edge of the read shield by the stray field. It must be taken into consideration that when the stray field is applied in parallel to the surface of the medium, a magnetic flux absorbed by the under layer flows into the auxiliary pole and the read shield. Patent document 1 does not take into consideration that the magnetic flux absorbed by the under layer flows into the auxiliary pole and the read shield when the stray field is applied in parallel to the surface of the medium. This problem should be solved to realize HDD making use of perpendicular recording.

It is therefore a feature of the present invention to provide a magnetic head which prevents data from being erased even when a stray field is applied to HDD in parallel to the surface of a medium and a high-density magnetic disk storage apparatus mounting the head.

The magnetic head according to one embodiment of the present invention comprises a read head having a lower shield, an upper shield and a magneto resistive element sandwiched between the lower shield and the upper shield, and a write head having a main pole and an auxiliary pole and a stray-field shield composed of a magnetic layer sandwiched between the auxiliary pole and the main pole. The stray-field shield absorbs a magnetic field floating in HDD and the magnetic flux of an under layer and reduces a magnetic field leaked from the auxiliary pole, lower shield and upper shield so as to reduce a magnetic field to be applied to the magnetic recording layer.

According to embodiments of the present invention, there can be provided a write head and a magnetic disk device mounting the write head which can reduce a magnetic field leaked from the auxiliary pole, lower shield and upper shield when a stray field is applied to HDD, especially a stray field is applied in parallel to the medium of HDD, thereby preventing the deterioration and erasure of a recording bit of the magnetic recording layer.

BRIEF DESCRIPTION OF THE DRAWINGS

FIGS. 9(a) and 9(b) are diagrams of a magnetic disk storage apparatus.

FIG. 11 is a diagram showing the relationship between an erasure field at the center of the recording layer generated by a stray field and cross-track displacement.

FIG. 12 is a diagram showing the relationship between an erasure field at the center of the recording layer generated by a stray field and the recession of the stray-field shield.

FIG. 13 is a diagram showing the relationship between an erasure field at the center of the recording layer generated by a stray field and the distance between the stray-field shield and the auxiliary pole.

DETAILED DESCRIPTION OF THE INVENTION

Figure 1:
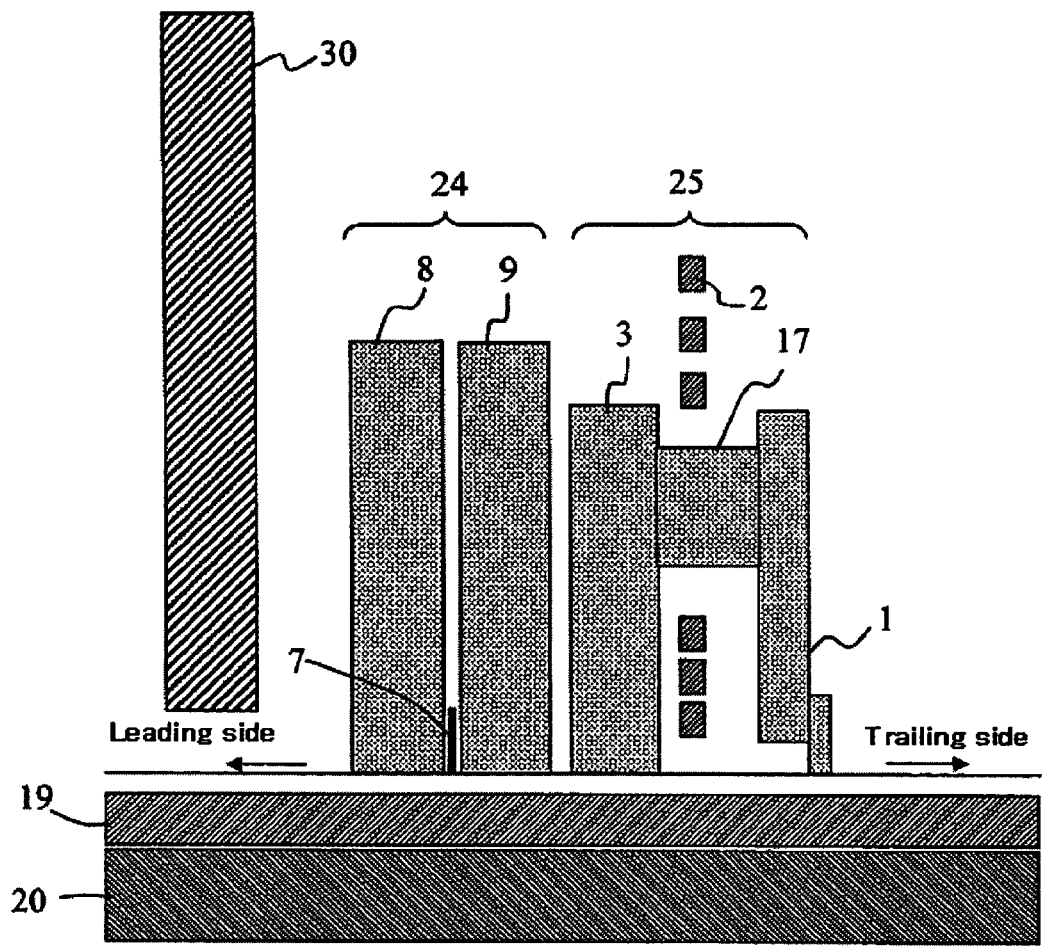
FIG. 1 is a sectional view of an example of the magnetic head of the present invention.

Specific embodiments of the present invention will be described with reference to the drawings. In the following drawings, the same function parts have the same reference symbols for easy understanding.

FIG. 9 is a conceptual diagram of a magnetic disk storage apparatus according to an embodiment of the present invention. The magnetic disk storage apparatus writes and reads a magnetization signal with a magnetic head mounted on a slider 13 fixed at the end of a suspension arm 12 at a predetermined position on a magnetic disk (magnetic recording medium) which is turned by a motor 28. By driving a rotary actuator 15, the position (track) in the radial direction of a magnetic disk of the magnetic head can be selected. A write signal to the magnetic head and a read signal from the magnetic head are processed by signal processing circuits 35a and 35b, respectively.

Figure 2:
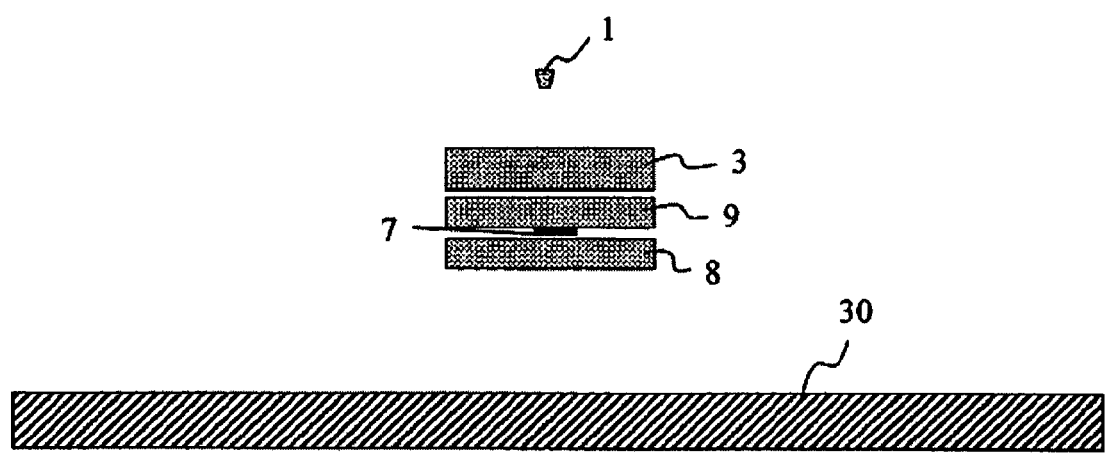
FIG. 2 is a diagram of the magnetic head of the present invention when seen from the air bearing surface.
Figure 3:
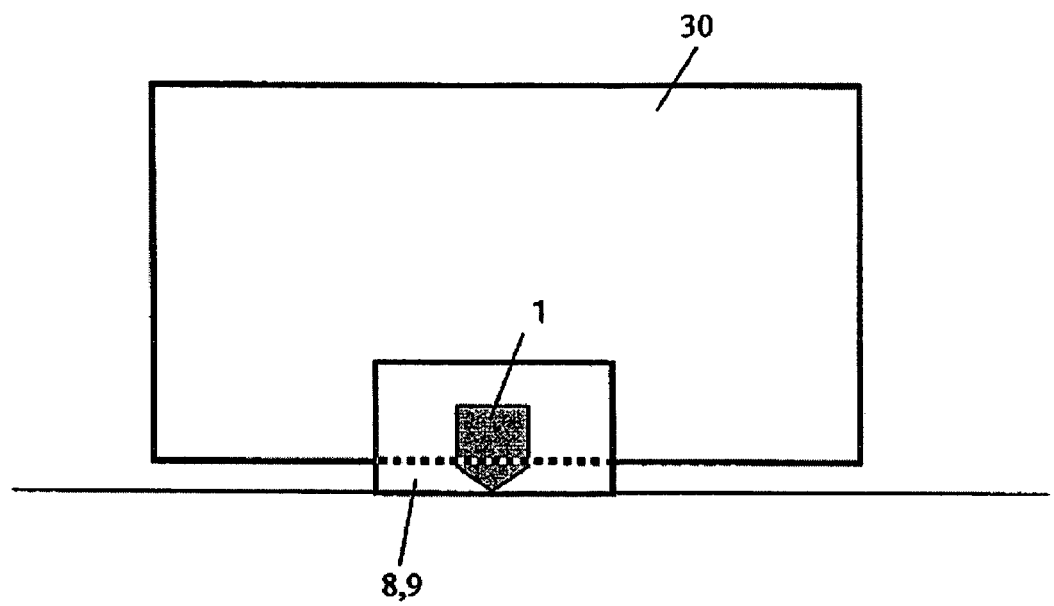
FIG. 3 is a plan view of the magnetic head of the present invention.

FIG. 1 is a sectional view of an example of the magnetic head of the present invention. FIG. 2 is a structural diagram of the magnetic head shown in FIG. 1 when seen from the air bearing surface and FIG. 3 is a plan view thereof.

This magnetic head is a read/write composite head having a write head 25 comprising a main pole 1 and an auxiliary pole 3 and a read head 24 comprising a read element 7. The main pole 1 and the auxiliary pole 3 are magnetically connected to each other by a pillar 17 at a position away from the air bearing surface, and thin film coils 2 are interlinked with a magnetic circuit constituted by the main pole 1, auxiliary pole 3 and pillar 17. The read element 7 which is composed of a giant magneto resistive element (GMR) or tunneling magneto resistive element (TMR) is interposed between a pair of magnetic shields (read shields) which are a lower shield 8 on the leading side and an upper shield 9 on the trailing side. The main pole 1 is arranged on the trailing side of the auxiliary pole 3. At a position recessed from the air bearing surface of the head, a stray-field shield 30 which is composed of a magnet is installed. In this embodiment, the auxiliary pole 3, lower shield 8 and upper shield 9 are sandwiched between the magnetic pole 1 and the stray-field shield 30.

Figure 4:
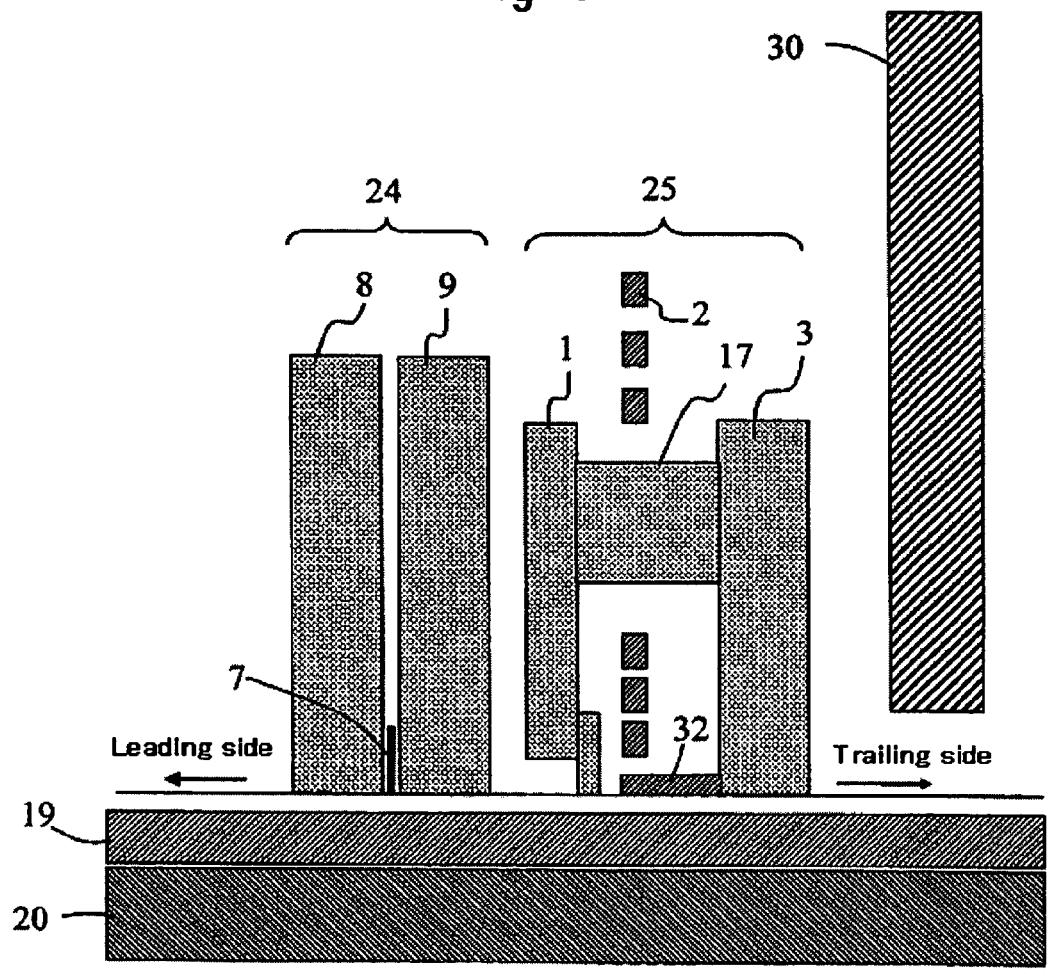
FIG. 4 is a sectional view of another example of the magnetic head of the present invention.

FIG. 4 is a sectional view of another example of the magnetic head of the present invention. The magnetic head shown in FIG. 4 differs from the magnetic head shown in FIG. 1 in the arrangement of the main pole 1 and the auxiliary pole 3 of the write head 25. That is, the main pole 1 is arranged on the leading side of the auxiliary pole 3. A magnetic layer 32 is arranged on the trailing side of the main pole 1 to increase field gradients. The auxiliary pole 3 is sandwiched between the stray-field shield 30 which is composed of a magnet arranged at a position recessed from the air bearing surface of the head and the main pole 1.

Figure 5:
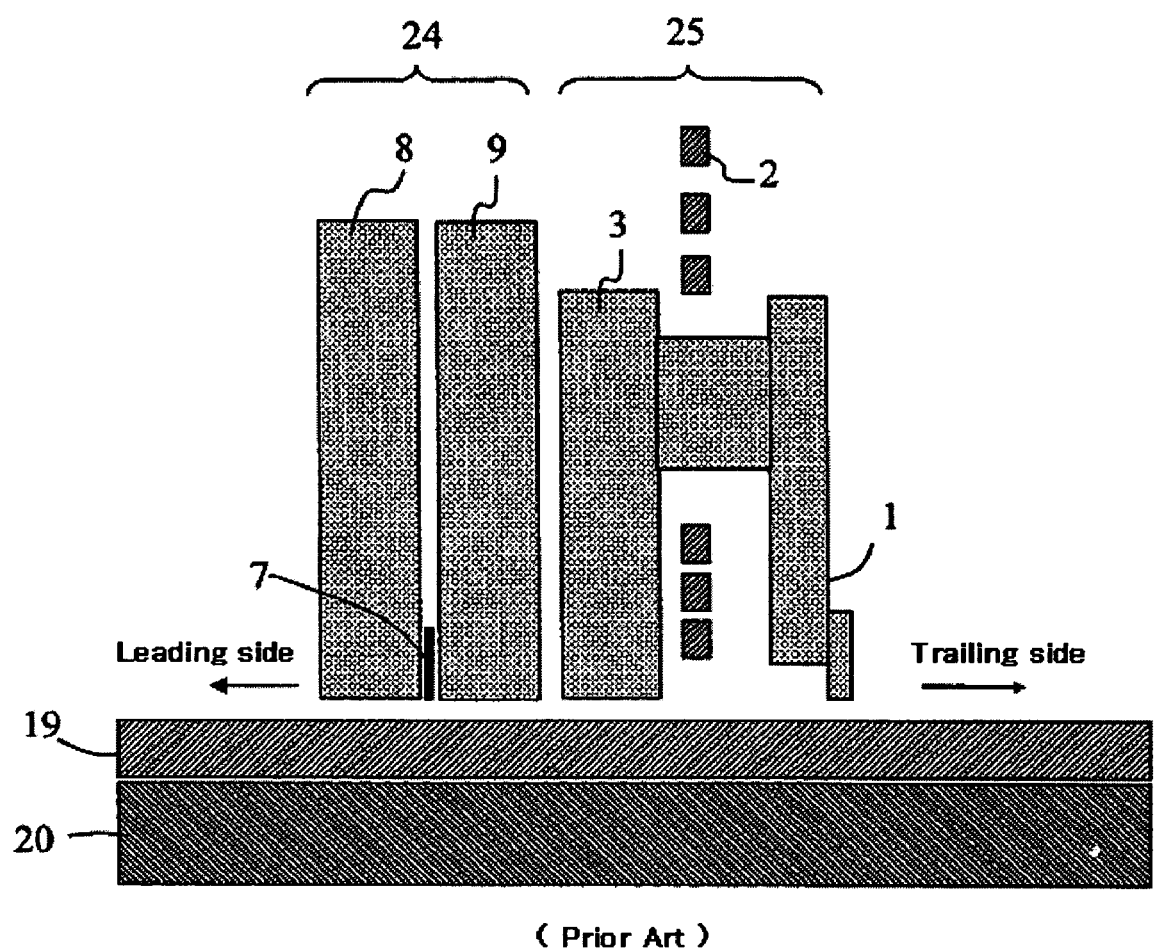
FIG. 5 is a diagram showing the structure of the magnetic head of the prior art.
Figure 6:
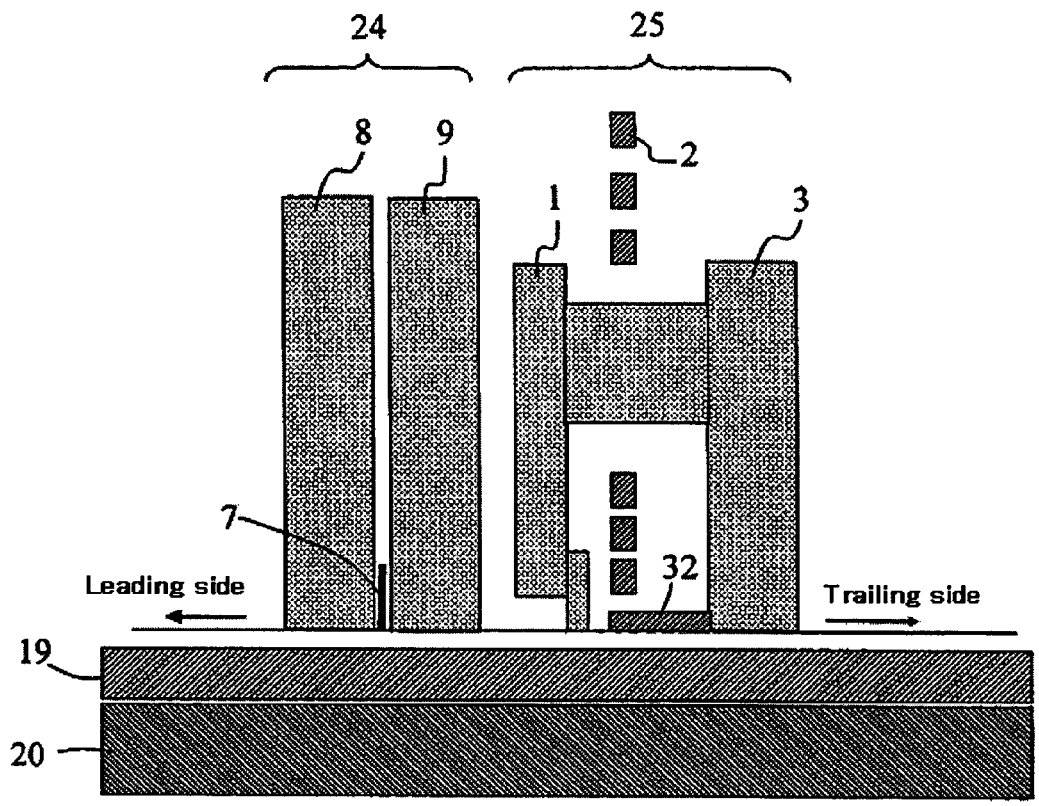
FIG. 6 is a diagram showing the structure of another magnetic head.
Figure 7:
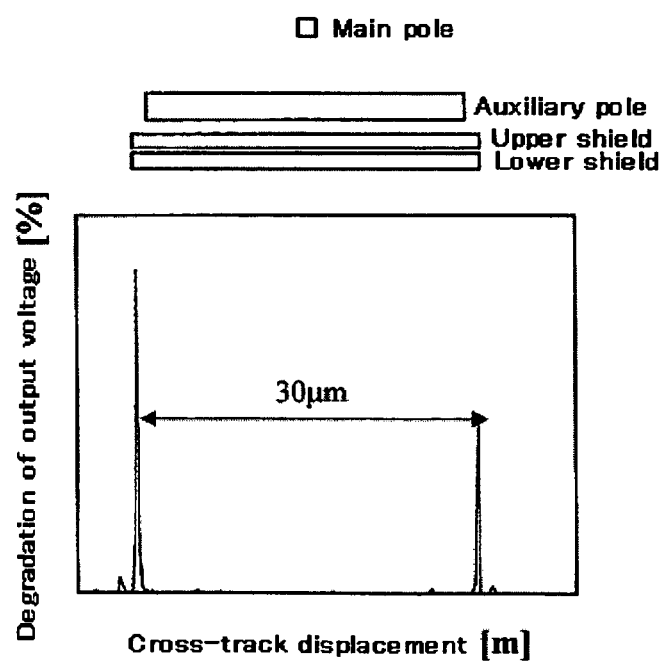
FIG. 7 is a diagram showing the relationship between the cross-track displacement and degradation of output voltage in the magnetic head of the prior art.
Figure 8:
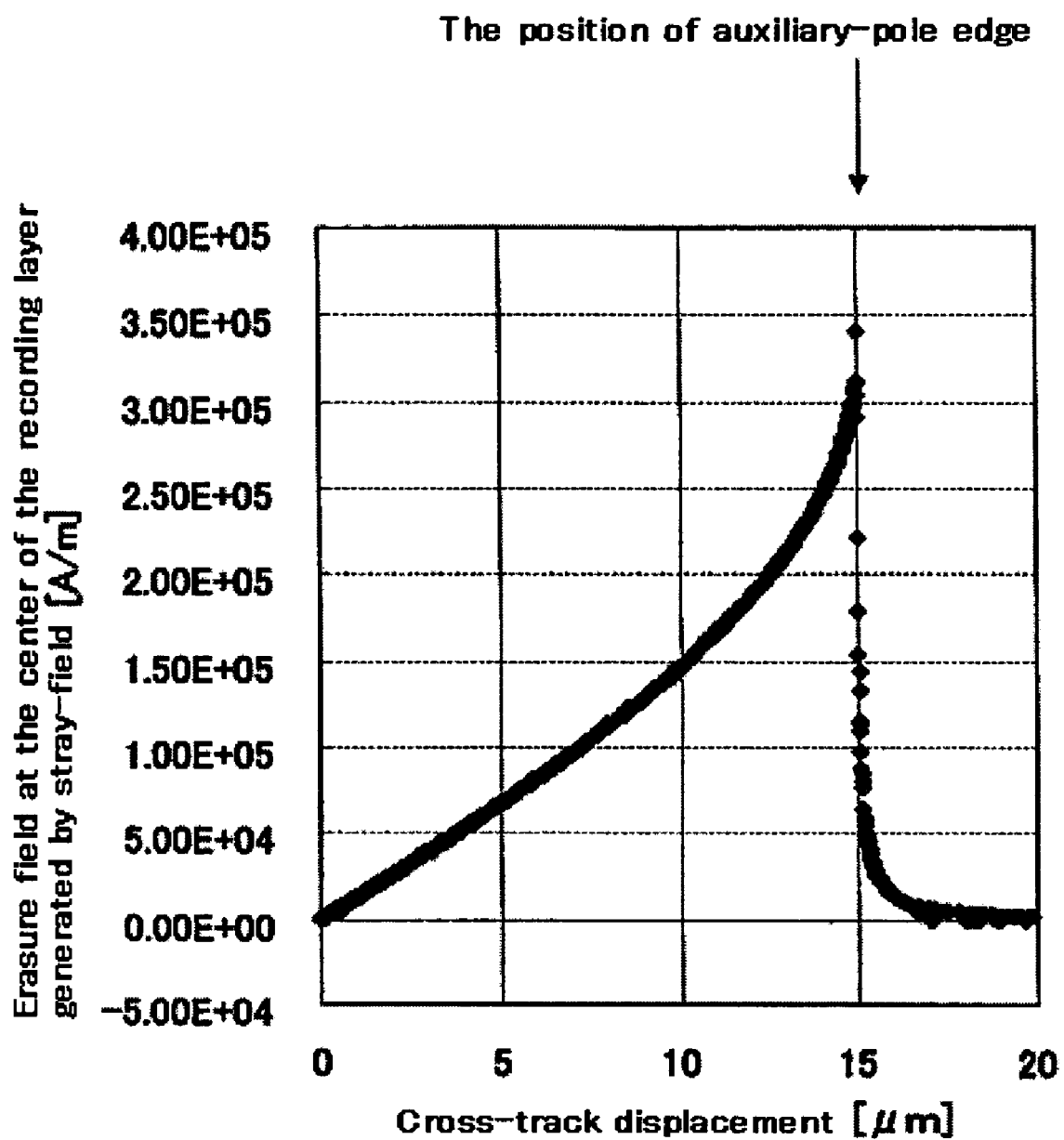
FIG. 8 is a diagram showing the relationship between an erasure field at the center of the recording layer generated by a stray field and cross-track displacement in the magnetic head of the prior art.

As for the head having the conventional structure shown in FIG. 5, when a stray field is applied to HDD, a magnetic field leaks from the auxiliary pole 3, lower shield 8 and upper shield 9 to erase data on the magnetic recording layer 19. To cope with this, in the present embodiment, the stray-field shield 30 which is composed of a magnetic layer is arranged on the leading side of the auxiliary pole 3 in the example of FIG. 1 and on the trailing side of the auxiliary pole 3 in the example of FIG. 4 at a position recessed from the air bearing surface in order to sandwich the auxiliary pole 3 between it and the main pole 1. The present embodiment is aimed to reduce a magnetic field generated from the edges of the auxiliary pole 3, lower shield 8 and upper shield 9 and accordingly, the stray-field shield 30 is arranged closer to the auxiliary pole 3 than to the main pole 1. Thereby, a magnetic field leaked from the auxiliary pole 3 is reduced and the erasure of information recorded on the magnetic recording layer 19 can be prevented.

A magnetic field applied to the magnetic recording layer 19 from the edge of the auxiliary pole of the magnetic head having the conventional structure shown in FIG. 5 was calculated by 3-D magnetic field computation. In the calculation, the write-track width of the main pole 1 was 150 nm, and the film thickness of the main pole was 200 nm. It was supposed that the main pole was made of CoNiFe. It was supposed that the auxiliary pole 3 was made of a material having a saturated flux density of 1.0 T and had a width in the track-width direction of 30 μm, a length in the element-height direction of 16 μm and a film thickness of 2 μm. It was supposed that the upper shield 9 and the lower shield 8 were made of 80 at % Ni-20 at % Fe having a saturation flux density of 1.0 T and had a width in the track-width direction of 30 μm, a length in the element-height direction of 16 μm and a film thickness of 1.5 μm. It was supposed that the under layer 20 of the magnetic recording medium was made of CoTaZr, the distance between the air bearing surface of the head and the surface of the under layer 20 was 40 nm, and the film thickness of the under layer 20 was 300 nm.

In the case of the magnetic head having the conventional structure shown in FIG. 5, according to the 3-D magnetic field computation, the maximum value of the magnetic field applied to the magnetic recording layer 19 from the edge of the auxiliary pole is $3.41 \times 10^5$ A/m. The magnetic field applied to the recording layer causes the deterioration or erasure of a recording bit.

As for the magnetic head having the structure of the present embodiment shown in FIG. 1, the magnetic field applied to the magnetic recording layer 19 from the edge of the auxiliary pole was also calculated by 3-D magnetic field computation. The magnetic head of the present embodiment shown in FIG. 1 comprises the stray-field shield 30 unlike the magnetic head having the conventional structure shown in FIG. 5. The stray-field shield 30 is separated from the auxiliary pole 3 by 15 μm and has a width in the track-width direction of 100 μm, a length in the element-height direction of 50 μm and a film thickness of 2 μm. It was supposed that the stray-field shield 30 was made of 80 at % Ni-20 at % Fe having a saturated magnetic flux density of 1.0 T and a relative permeability of 1,500. It may be made of 45 at % Ni-55 at % Fe having a small thermal expansion coefficient. Or it may be a soft magnetic film such as CoNiFe. The stray-field shield 30 is recessed 1 μm from the air bearing surface. Alumina $Al_2O_3$ is embedded in the recessed portion. The maximum value of a magnetic field applied to the magnetic recording layer from the edge of the auxiliary pole was $2.15 \times 10^5$ A/m when it was calculated under the above conditions.

FIG. 11 shows cross-track displacements obtained by 3-D magnetic field computation. It is understood that the magnetic head of the present embodiment shown in FIG. 1 comprising the stray-field shield 30 has about 30% lower magnetic field strength than the magnetic head having the conventional structure shown in FIG. 5.

To obtain the effect of the present invention, the width of the stray-field shield 30 is made wider than the auxiliary pole 3, lower shield 8 and upper shield 9. The recession of the stray-field shield 30 from the air bearing surface of the head is desirably smaller than the distance between the stray-field shield 30 and the auxiliary pole 3 or the lower or upper shield 8 or 9 opposed to the stray-field shield 30. The reason is as follows. When the distance between the stray-field shield 30 and the auxiliary pole 3 or lower or upper shield 8 or 9 is smaller than the distance between the edge of the stray-field shield 30 and the air bearing surface of the head, magnetic resistance between the stray-field shield 30 and the auxiliary pole 3, or lower or upper shield 8 or 9 becomes smaller than the magnetic resistance between the soft under layer 20 and the stray-field shield 30. And then a magnetic flux absorbed by the stray-field shield 30 flows into the auxiliary pole 3 or lower or upper shield 8 or 9.

FIG. 12 shows the relationship between the recession of the stray-field shield 30 from the air bearing surface of the head and the maximum value of a magnetic field from the edge of the auxiliary pole 3 and the maximum value of a magnetic field from the edge of the stray-field shield 30. Although a magnetic field from the edge of the auxiliary pole 3 becomes small when the recession of the stray-field shield 30 becomes small, a magnetic field from the edge of the stray-field shield 30 becomes large. When the stray-field shield 30 is not recessed from the air-bearing surface of the head, the magnetic field leaked from the stray-field shield 30 is larger than that of leaked from the edge of the auxiliary pole 3 of the head which having no the stray-field shield 30. Therefore, the recession is desirably about 1 μm. JP-A No. 197619/2002 (Patent Document 2) and JP-A No. 101341/1993 (Patent Document 3) cannot obtain the effect of the present invention because a magnetic layer not recessed from the air bearing surface is provided. A magnetic field leaks from the edge of the magnetic layer and erases data as it is not recessed from the air bearing surface.

FIG. 13 shows the relationship between the distance between the stray-field shield 30 and the auxiliary pole 3 and a magnetic field applied to the magnetic recording layer 19 of the magnetic recording medium from the edge of the auxiliary pole 3. As the distance between the stray-field shield 30 and the auxiliary pole 3 becomes shorter, a magnetic field applied to the magnetic recording layer from the edge of the auxiliary pole 3 becomes smaller. However, it is known that when the distance becomes too small, a magnetic flux absorbed by the stray-field shield 30 flows into the auxiliary pole 3, lower shield 8 and upper shield 9. Therefore, the distance between the stray-field shield 30 and the auxiliary pole 3 is desirably about 5 μm or more.

In the present invention, to have the stray-field shield 30 absorb a magnetic flux from the under layer 20, the permeability of the stray-field shield 30 is desirably larger than those of the auxiliary pole 3, lower shield 8 and upper shield 9. For example, when the auxiliary pole 3 is made of 45 at % Ni-55 at % Fe, and the lower shield 8 and the upper shield 9 are made of 80 at % Ni-20 at % Fe, the stray-field shield 30 is preferably made of a material having a high Ni content, for example, 80 at % Ni-20 at % Fe.

As the stray-field shield 30 becomes longer in the element-height direction and a stray field is applied perpendicular to the magnetic disk, a magnetic field leaked from the stray-field shield 30 becomes larger. Then it is desired that the length in the element-height direction of the stray-field shield 30 should be a length in the track-width direction or less. This is because of the following reason. The stray-field shield 30 is a magnet and there is a pole at the edge. The pole makes a magnetic field external and internal to the magnetic layer (stray-field shield 30) but the inner magnetic field so called "demagnetizing field" has an opposite direction to the applied magnetic field. This demagnetizing field is in proportion to the magnetization of the magnetic layer (stray-field shield 30) and its proportional constant (demagnetizing factors) is determined only by the shape of the magnet. When the stray-field shield 30 is long in the element-height direction, the demagnetizing factors is reduced by the shape effect. Therefore, a magnetic field leaked from the stray-field shield 30 becomes larger. In contrast to this, by making the length in the track-width direction larger than the length in the element-height direction, the demagnetizing factors can be made large by the shape effect, thereby increasing the demagnetizing field in the stray-field shield 30. As a result, the stray-field shield absorbs a stray field floating in the magnetic disk device, thereby making it possible to reduce the stray field leaked to the magnetic recording layer from the stray-field shield 30.

Figure 10:
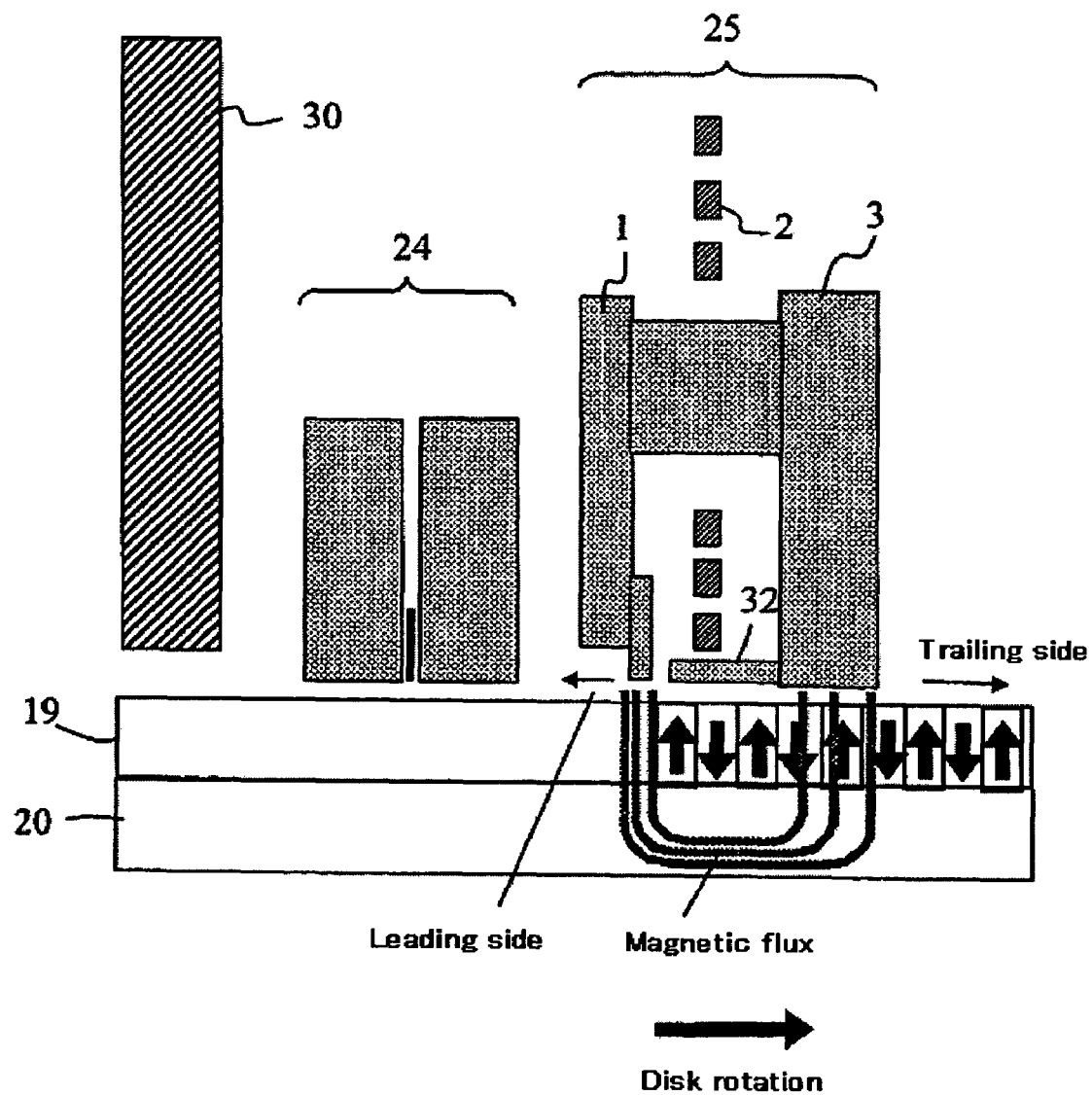
FIG. 10 is a diagram for explaining perpendicular recording.
Figure 1:
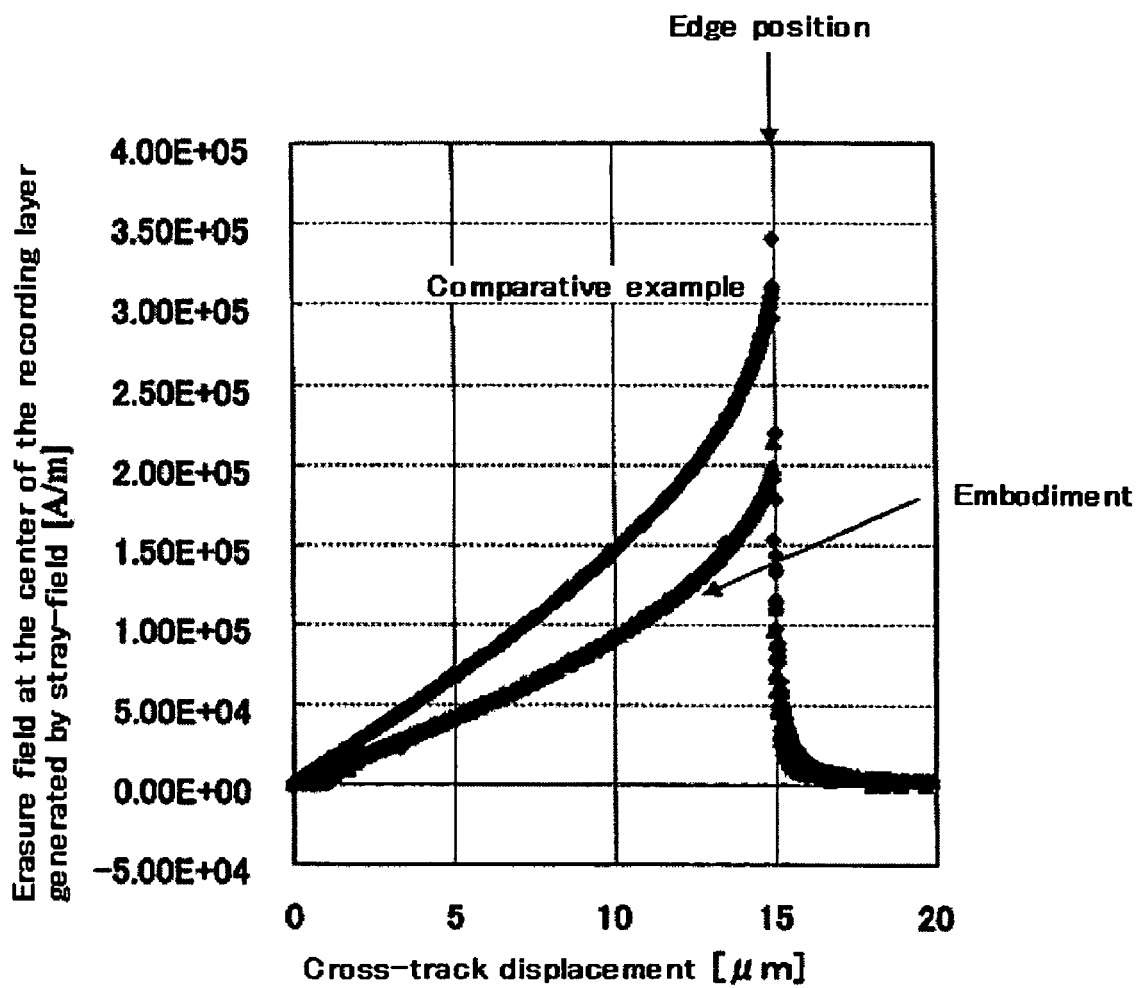
Figure 1:
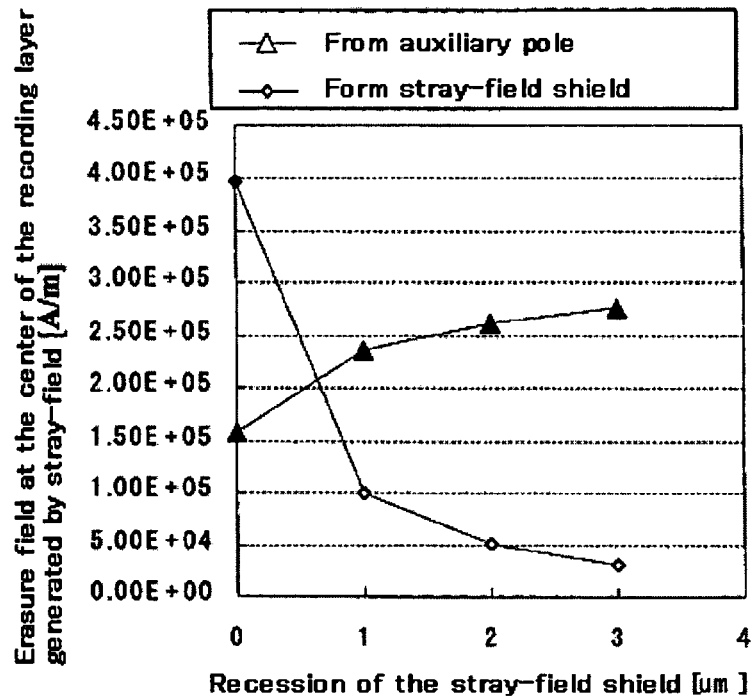
Figure 1:
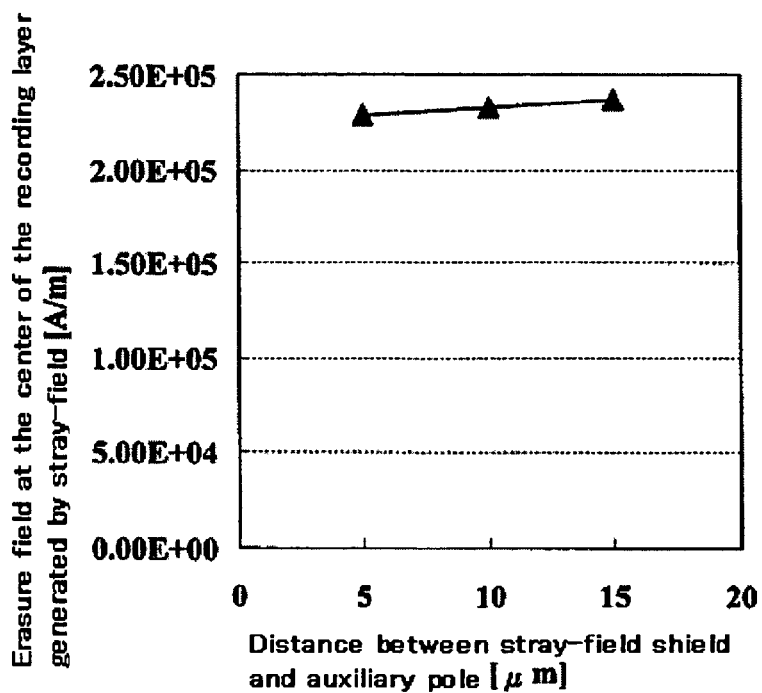

FIG. 10 shows the relationship between the perpendicular recording magnetic head 14 and the magnetic disk 11 and perpendicular recording. A magnetic circuit is formed from the main pole 1 of the write head 25 to the magnetic recording layer 19, the soft under layer 20 of the magnetic disk medium 11 and the auxiliary pole 3 to write a magnetization pattern to the magnetic recording layer 19. An intermediate layer may be formed between the magnetic recording layer 19 and the soft under layer 20. A giant magneto resistive element (GMR) or tunneling magneto resistive element (TMR) is used as the read element 7 of the read head 24.

Figure 14:
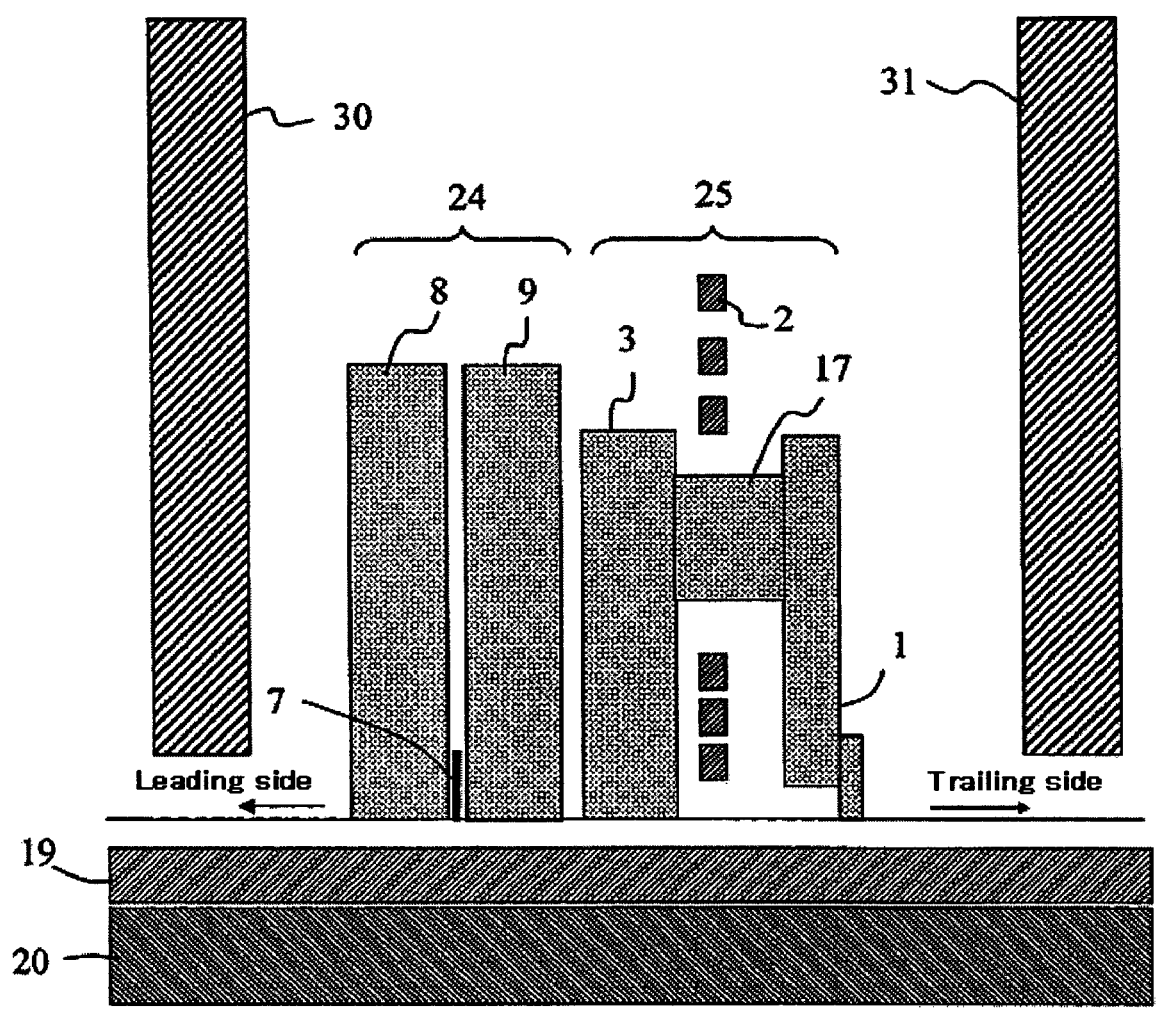
FIG. 14 is a sectional view of still another example of the magnetic head of the present invention.

FIG. 14 is a sectional view of another example of the magnetic head of the present invention. The magnetic head shown in this example is recessed from the air bearing surface so that a write head 25 and a read head 24 are both sandwiched between a pair of stray-field shields 30 and 31. The auxiliary pole 3 of the write head is arranged on the leading side of the main pole 1. Due to this structure, a magnetic field applied from the auxiliary pole 3, the lower shield 8 and the upper shield 9 to the recording medium can be reduced.

Figure 15:
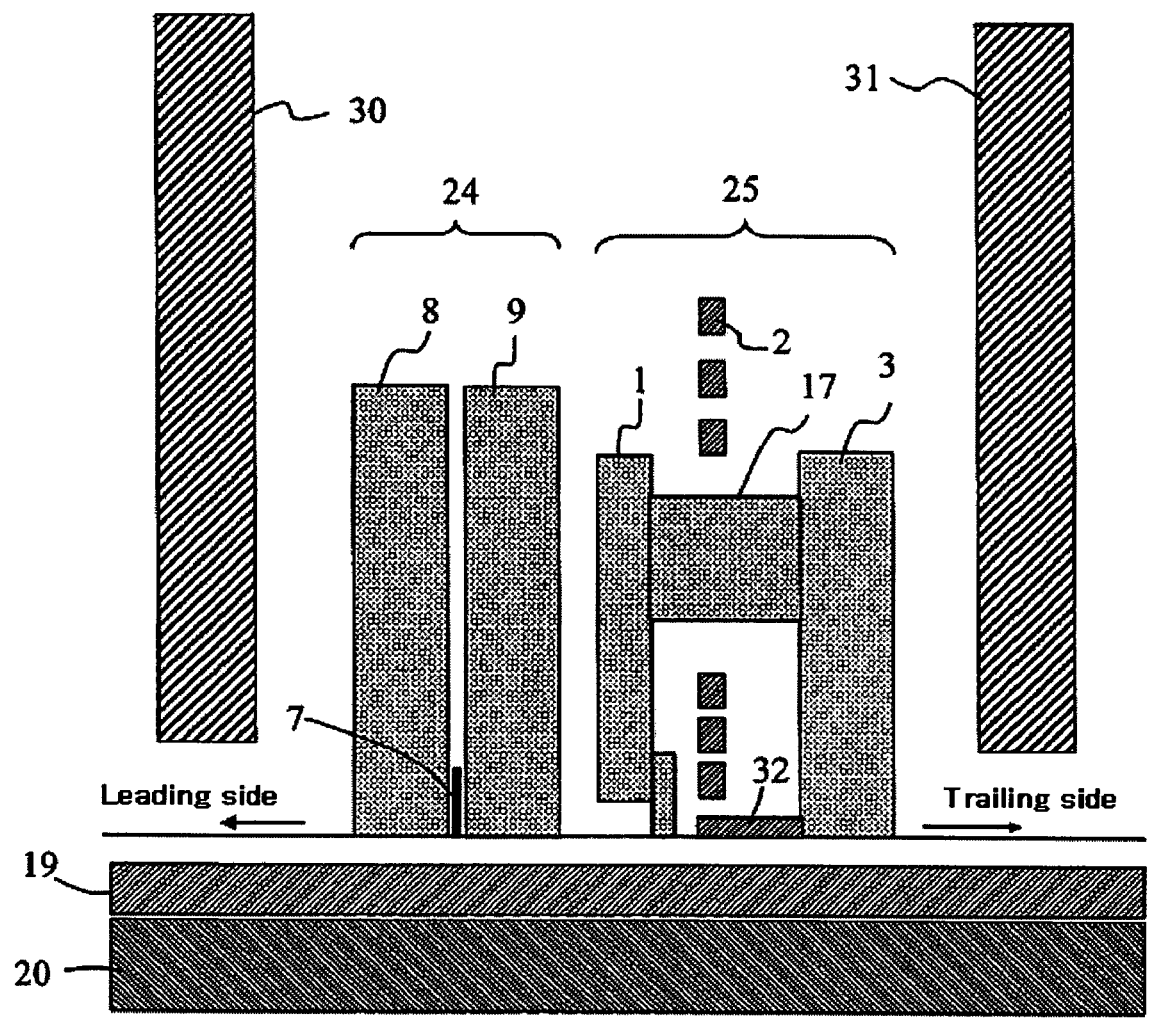
FIG. 15 is a sectional view of a further example of the magnetic head of the present invention.

FIG. 15 is a sectional view of still another example of the magnetic head of the present invention. The magnetic head shown in this example is also recessed from the air bearing surface so that the write head 25 and the read head 24 are both sandwiched between a pair of stray-field shields 30 and 31. This magnetic head differs from the magnetic head shown in FIG. 14 in that the auxiliary pole 3 of the write head 25 is arranged on the trailing side of the main pole 1 and the magnetic layer 32 is arranged on the trailing side of the main pole 1 to improve write field gradients. With this structure, a magnetic field applied from the auxiliary pole 3, lower shield 8 and upper shield 9 to the recording medium can be reduced.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
a main pole;
an auxiliary pole formed on a leading side of the main pole;
a stray-field shield formed on a leading side of the auxiliary pole; and
a second stray-field shield formed on a trailing side of the auxiliary pole,
wherein a face of the stray-field shield on a medium side is recessed from an air-bearing-surface of the magnetic head, and
wherein a read head having a lower read shield, an upper read shield and a magneto resistive element formed between the upper read shield and the lower read shield is interposed between the auxiliary pole and the stray-field shield.

2. The magnetic head according to claim 1, wherein a non-magnetic material is filled between the face of the stray-field shield on the medium side and the air-bearing-surface of the magnetic head.

3. The magnetic head according to claim 1, wherein the distance between the face of the stray-field shields on the medium side and the air-bearing-surface of the magnetic head is shorter than the distance between the stray-field shield and the lower read shield.

4. The magnetic head according to claim 1, wherein the stray-field shield has a length in the element-height direction smaller than a length in the track-width direction.

5. A magnetic head comprising:
a main pole;
an auxiliary pole formed on a leading side of the main pole;
a stray-field shield formed on the leading side of the auxiliary pole; and
wherein a face of the stray-field shield on a medium side is recessed from an air-bearing-surface of the magnetic head;
wherein a read head having a lower read shield, an upper read shield and a magneto resistive element formed between the upper read shield and the lower read shield is interposed between the auxiliary pole and the stray-field shield, and
wherein the width in the track-width direction of the stray-field shield is larger than the widths in the track-width direction of the auxiliary pole, lower shield and upper shield.

6. A magnetic head comprising:
a main pole;
an auxiliary pole formed on a leading side of the main pole; and
a stray-field shield formed on the leading side of the auxiliary pole,
wherein a face of the stray-field shield on a medium side is recessed from an air-bearing-surface of the magnetic head,
wherein a read head having a lower read shield, an upper read shield and a magneto resistive element formed between the upper read shield and the lower read shield is interposed between the auxiliary pole and the stray-field shield, and
wherein the height in the element-height direction of the stray-field shield is larger than the heights in the element-height direction of the auxiliary pole, lower shield and upper shield.

7. A magnetic head comprising:
a main pole;
an auxiliary pole formed on a trailing side of the main pole; and
a stray-field shield formed on the trailing side of the auxiliary pole,
wherein a face of the stray-field shield on a medium side is recessed from the air-bearing-surface of the magnetic head.

8. The magnetic head according to claim 7, wherein a non-magnetic material is filled between the face of the stray-field shield on the medium side and the air-bearing-surface of the magnetic head.

9. The magnetic head according to claim 7, wherein a read head having a lower read shield, an upper read shield and a magneto resistive element formed between the upper read shield and the lower read shield is provided on a leading side of the main pole.

10. The magnetic head according to claim 9, wherein the distance between the face of the stray-field shield on the medium side and the air-bearing-surface of the magnetic head is shorter than the distance between the stray-field shield and the auxiliary pole.

11. The magnetic head according to claim 9, wherein the width in the track-width direction of the stray-field shield is larger than the widths in the track-width direction of the auxiliary pole, lower shield and upper shield.

12. The magnetic head according to claim 9, wherein the height in the element-height direction of the stray-field shield is larger than the heights in the element-height direction of the auxiliary pole, lower shield and upper shield.

13. The magnetic head according to claim 7, wherein the stray-field shield has a length in the element-height direction smaller than a length in the track-width direction.

14. The magnetic head according to claim 7, further comprising a second stray shield formed on a leading side of the main pole.

15. A magnetic disk storage apparatus comprising:
a magnetic recording medium having a magnetic recording layer and a soft under layer;
a medium drive unit configured to drive the magnetic recording medium;
a magnetic head for writing to and reading from the magnetic recording medium; and
a magnetic head drive unit configured to drive the magnetic head relative to the magnetic recording medium, wherein
the magnetic head comprises:
a write head having a main pole and an auxiliary pole formed on the leading side of the main pole;

a stray-field shield formed on a leading side of the auxiliary pole;

a second stray-field shield formed on a trailing side of the auxiliary pole; and a read head which has a lower read shield, an upper read shield and a magneto resistive element formed between the upper read shield and the lower read shield and which is formed between the auxiliary pole and the stray-field shield, wherein a face of the stray-field shield on a medium side is recessed from the air-bearing-surface of the magnetic head.

16. The magnetic disk storage apparatus according to claim 15, wherein a non-magnetic material is filled between the face of the stray-field shield on the medium side and the air-bearing-surface of the magnetic head.

17. The magnetic disk storage apparatus according to claim 15, wherein the distance between the face of the stray-field shield on the medium side and the air-bearing-surface of the magnetic head is shorter than the distance between the stray-field shield and the lower read shield.

18. The magnetic disk storage apparatus according to claim 15, wherein the stray-field shield has a length in the element-height direction smaller than a length in the track-width direction.

19. A magnetic disk storage apparatus comprising:

a magnetic recording medium having a magnetic recording layer and a soft under layer;

a medium drive unit configured to drive the magnetic recording medium;

a magnetic head for writing to and reading from the magnetic recording medium; and a magnetic head drive unit configured to drive the magnetic head relative to the magnetic recording medium, wherein the magnetic head comprises:

a write head having a main pole and an auxiliary pole formed on the leading side of the main pole;

a stray-field shield formed on a leading side of the auxiliary pole;

a second stray-field shield formed on a trailing side of the auxiliary pole; and a read head which has a lower read shield, an upper read shield and a magneto resistive element formed between the upper read shield and the lower read shield and which is formed between the auxiliary pole and the stray-field shield, wherein a face of the stray-field shield on a medium side is recessed from the air-bearing-surface of the magnetic head, and wherein the width in the track-width direction of the stray-field shield is larger than the widths in the track-width direction of the auxiliary pole, lower shield and upper shield.

20. A magnetic disk storage apparatus comprising:

a magnetic recording medium having a magnetic recording layer and a soft under layer;

a medium drive unit configured to drive the magnetic recording medium;

a magnetic head for writing to and reading from the magnetic recording medium; and a magnetic head drive unit configured to drive the magnetic head relative to the magnetic recording medium, wherein the magnetic head comprises:

a write head having a main pole and an auxiliary pole formed on the leading side of the main pole;

a stray-field shield formed on a leading side of the auxiliary pole;

a second stray-field shield formed on a trailing side of the auxiliary pole; and a read head which has a lower read shield, an upper read shield and a magneto resistive element formed between the upper read shield and the lower read shield and which is formed between the auxiliary pole and the stray-field shield, wherein a face of the stray-field shield on a medium side is recessed from the air-bearing-surface of the magnetic head, and wherein the height in the element-height direction of the stray-field shield is larger than the heights in the element-height direction of the auxiliary pole, lower shield and upper shield.

21. A magnetic disk storage apparatus comprising:

a magnetic recording medium having a magnetic recording layer and a soft under layer;

a medium drive unit configured to drive the magnetic recording medium;

a magnetic head for writing to and reading from the magnetic recording medium; and a magnetic head drive unit configured to drive the magnetic head relative to the magnetic recording medium, wherein the magnetic head comprises:

a write head having a main pole and an auxiliary pole formed on the trailing side of the main pole;

a stray-field shield formed on a trailing side of the auxiliary pole; and a read head which has a lower read shield, an upper read shield and a magneto resistive element formed between the upper read shield and the lower read shield and which is formed on a leading side of the main pole, wherein a face of the stray-field shield on a medium side is recessed from the air-bearing-surface of the magnetic head.

22. The magnetic disk storage apparatus according to claim 21, wherein a non-magnetic material is filled between the face of the stray-field shield on the medium side and the air-bearing-surface of the magnetic head.

23. The magnetic disk storage apparatus according to claim 21, wherein the distance between the face of the stray-field shield on the medium side and the air-bearing-surface of the magnetic head is shorter than the distance between the stray-field shield and the auxiliary pole.

24. The magnetic disk storage apparatus according to claim 21, wherein the width in the track-width direction of the stray-field shield is larger than the widths in the track-width direction of the auxiliary pole.

25. The magnetic disk storage apparatus according to claim 21, wherein the height in the element-height direction of the stray-field shield is larger than the heights in the element-height direction of the auxiliary pole, lower shield and upper shield.

26. The magnetic disk storage apparatus according to claim 21, wherein the stray-field shield has a length in the element-height direction smaller than a length in the track-width direction.

27. The magnetic disk storage apparatus according to claim 21, further comprising a second stray shield formed on a leading side of the main pole.

* * * * *

UNITED STATES PATENT AND TRADEMARK OFFICE
CERTIFICATE OF CORRECTION

| | |
|---|---|
| PATENT NO. | : 7,426,092 B2 |
| APPLICATION NO. | : 11/173730 |
| DATED | : June 30, 2005 |
| INVENTOR(S) | : Hiroshi Fukui et al. |

It is certified that error appears in the above-identified patent and that said Letters Patent is hereby corrected as shown below:

Column 10, claim 24, line 53 please amend "direction of the auxiliary pole" to
-- direction of the auxiliary pole, lower shield and upper shield. --

Signed and Sealed this

Second Day of December, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,426,092 B2 | Page 1 of 1 |
| APPLICATION NO. | : 11/173730 | |
| DATED | : September 16, 2008 | |
| INVENTOR(S) | : Hiroshi Fukui et al. | |

It is certified that error appears in the above-identified patent and that said Letters Patent is hereby corrected as shown below:

Column 10, claim 24, line 53 please amend "direction of the auxiliary pole" to
-- direction of the auxiliary pole, lower shield and upper shield. --

This certificate supersedes the Certificate of Correction issued December 2, 2008.

Signed and Sealed this

Twenty-third Day of December, 2008

JON W. DUDAS
*Director of the United States Patent and Trademark Office*